United States Patent
Ramaswamy

(10) Patent No.: US 9,760,177 B1
(45) Date of Patent: Sep. 12, 2017

(54) COLOR MAPS FOR OBJECT TRACKING

(71) Applicant: Amazon Technologies, Inc., Reno, NV (US)

(72) Inventor: Sharadh Ramaswamy, Sunnyvale, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 13/929,648

(22) Filed: Jun. 27, 2013

(51) Int. Cl.
*G06F 9/00* (2006.01)
*G06F 3/01* (2006.01)

(52) U.S. Cl.
CPC .................................... *G06F 3/017* (2013.01)

(58) Field of Classification Search
CPC ......... G06T 7/2093; G06T 2207/10024; G06T 2207/10028
See application file for complete search history.

(56) References Cited

U.S. PATENT DOCUMENTS

| 7,003,136 | B1* | 2/2006 | Harville | 382/103 |
| 2004/0151401 | A1* | 8/2004 | Sawhney | 382/299 |
| 2011/0211754 | A1* | 9/2011 | Litvak | 382/165 |
| 2012/0119985 | A1* | 5/2012 | Kang | 345/156 |

OTHER PUBLICATIONS

A. Bleiweiss and M. Werman. Fusing time-of-flight depth and color for real-time segmentation and tracking. In Proc. DAGM Workshop on Dynamic 3D Imaging, pp. 58-69, 2009.*
R. Hartley and A. Zisserman, "Multiple View Geometry in Computer Vision, Second Edition": Cambridge Univ. Press, Apr. 2004.*

* cited by examiner

*Primary Examiner* — Bhavesh Mehta
*Assistant Examiner* — Ian Lemieux
(74) *Attorney, Agent, or Firm* — Polsinelli LLP

(57) ABSTRACT

The amount of power and processing needed to enable more previze gesture input for a computing device can be reduced by utilizing one or more gesture sensors along with a conventional camera. Information associated with an image, such as color information, acquired from the conventional camera can be mapped to one or more gesture sensors (e.g., low resolution, greyscale or monochrome camera sensors) of a computing device. The mapped information between the conventional camera and the gesture sensors can be used for purposes such as gesture- and/or motion-based approaches.

18 Claims, 6 Drawing Sheets

COLOR MAPS FOR OBJECT TRACKING

BACKGROUND

People are increasingly interacting with computers and other electronic devices in new and interesting ways. One such interaction approach involves making a detectable motion with respect to a device, which can be detected using a camera or other such element. While image recognition can be used with existing cameras to determine various types of motion, the amount of processing needed to analyze full color, high resolution images is generally very high. This can be particularly problematic for portable devices that might have limited processing capability and/or limited battery life, which can be significantly drained by intensive image processing. Some devices utilize basic gesture detectors, but these detectors typically are very limited in capacity and limited to the type of motion that can be detected.

BRIEF DESCRIPTION OF THE DRAWINGS

Various embodiments in accordance with the present disclosure will be described with reference to the drawings, in which.

DETAILED DESCRIPTION

Figure 1:
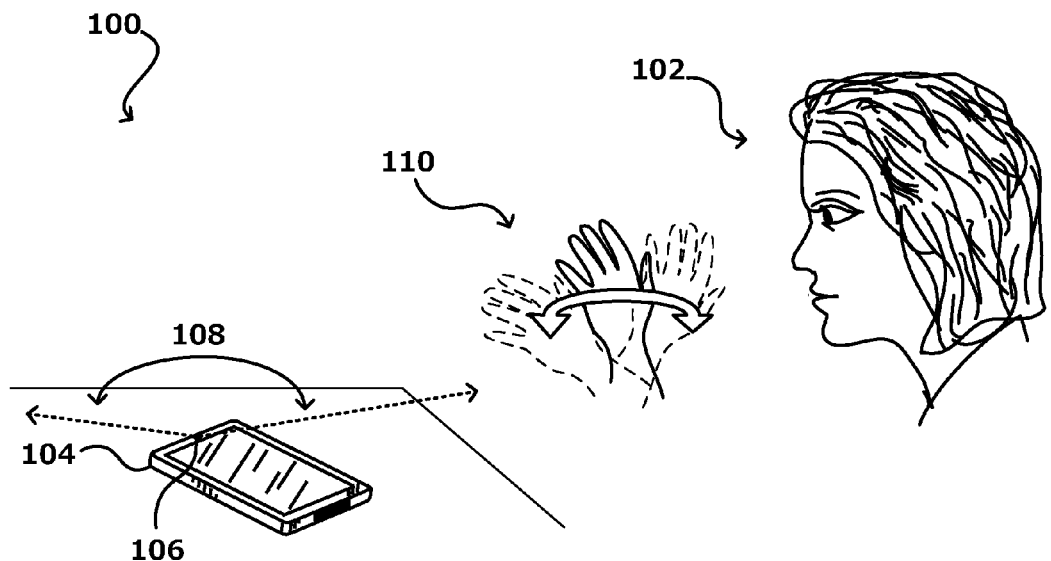
FIG. 1 illustrates an example environment in which various aspects can be implemented in accordance with various embodiments.

Systems and methods in accordance with various embodiments of the present disclosure may overcome one or more of the aforementioned and other deficiencies experienced in conventional approaches to providing input to an electronic device. In particular, various approaches provide for determining and enabling gesture- and/or motion-based input for an electronic device. Various approaches can be used for head tracking, gaze tracking, or other such purposes as well. Such approaches enable relatively complex motions to be tracked and/or interpreted with lower cost and power consumption than conventional approaches. For example, in various embodiments, information associated with an image, such as color information, acquired from a first camera (e.g., a color camera) of a computing device can be mapped to a second camera (e.g., a greyscale or monochrome camera such as a gesture sensor) of the computer device. The information can be used as an additional input for tasks such as motion tracking. In such an approach, once a mapping between the first camera and the second camera is determined (or between any number of cameras), information obtained from an image captured using one of those cameras can be used to verify information for corresponding objects represented in each image. In various embodiments, position information of the object represented in the first image can be determined. Accordingly, the color information and the position information can be mapped (e.g., using at least one transformation function) to the second camera. The position information can be used to identify a location of the object represented in an image captured by the second camera. As subsequent images of the object are captured by the second camera, the object can be tracked based at least in part on the position information and color information mapped from the first camera. For example, as the second camera captures images, the color and position information can be prorogated between each captured image, and one of more object tracking algorithms (e.g., mean-shift tracking algorithm) can be used to track the object in the images. Further, these approaches can be implemented in a camera-based sensor subsystem in at least some embodiments, which can be utilized advantageously in devices such as tablet computers, smart phones, electronic book readers, wearable computers (e.g., smart watches, smart glasses, etc.), or any system where there is a combination of low power, high frame rate monochrome cameras and high power, low frame rate color cameras. Various other applications, processes, and uses are presented below with respect to the various embodiments.

In at least one embodiment, a gesture sensor can be utilized that can be the same size as, or smaller than, a conventional camera element (e.g., a high resolution color camera), such as ⅓ or ¼ of the size of a conventional camera or less. Further, in at least some embodiments, a subset of the pixels (e.g., one or more) on the gesture sensor can be used as a low power motion detector. In other embodiments, subsets of pixels can be read and/or analyzed together to provide a lower resolution image. In various embodiments, gesture sensors can be used to distinguish between objects on the basis of their greyscale values. The intensity at various locations can be monitored and compared, and certain changes indicative of motion can cause the gesture sensor to "wake up" or otherwise become fully active and attempt, at full or other increased resolution, to determine whether the motion corresponds to a gesture. If the motion corresponds to a gesture, other functionality on the device can be activated as appropriate, such as to trigger a separate camera element to perform facial recognition or another such process. However, as described, while gestures can be tracked and/or interpreted with existing gesture sensors to determine various types of motion, these sensors typically only use greyscale or monochrome image information. As such, in some situations, gesture- and/or motion-based approaches may be limited in the type of motion that can be detected, tracked, and/or interpreted. Accordingly, in accordance with various embodiments, information such as color information, intensity values, or other information acquired by a conventional camera (e.g., a color camera) of a computing device can be mapped from the conventional camera to a gesture sensor of the computing device, where such mapping takes into account the different resolutions of the cameras and sensors and position of said cameras relative to the gesture sensors on the computing device. In various embodiments, the information can be used in gesture- and/or motion-based image processing techniques. In accordance with various embodiments, such an approach provides various advantages, including reduced power consumption and lower resolution images that require less processing capacity while still providing sufficient resolution for gesture recognition. Further, the ability to provide additional information, such as color information, to the gesture sensor improves gesture- and/or motion-based approaches by providing additional cues to such approaches, thereby making the approaches more robust. For example, in addition to gesture- and/or motion-based approaches that rely on greyscale or monochrome image information, approaches that use color information, such as a mean shift tracker or an elliptic tracker can also be used.

FIG. 1 illustrates an example situation 100 wherein a user 102 would like to provide gesture- and/or motion-based input to a computing device 104. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, wearable computers (e.g., smart watches, smart glasses, etc.), and portable media players, among others. In this example, the computing device 104 has at least one image capture element 106 operable to perform functions such as image and/or video capture. Each image capture element may be, for example, a camera, a charge-coupled device (CCD), a motion detection sensor, or an infrared sensor, or can utilize another image capturing technology.

In this example, the user 102 is performing a selected motion or gesture using the user's hand 110. The motion can be one of a set of motions or gestures recognized by the device to correspond to a particular input or action. If the motion is performed within a viewable area or angular range 108 of at least one of the imaging elements 106 on the device, the device can capture image information including the motion, analyze the image information using at least one image analysis or feature recognition algorithm, and determine movement of a feature of the user between subsequent frames. This can be performed using any process known or used for determining motion, such as locating "unique" features in one or more initial images and then tracking the locations of those features in subsequent images, whereby the movement of those features can be compared against a set of movements corresponding to the set of motions or gestures, etc.

As discussed above, however, analyzing full color, high resolution images from one or more cameras can be very processor, resource, and power intensive, particularly for mobile devices. Conventional complementary metal oxide semiconductor (CMOS) devices consume less power than other conventional camera sensors, such as charge coupled device (CCD) cameras, and thus can be desirable to use as a gesture sensor. Further, CMOS have a relatively standard form factor with many relatively inexpensive and readily available components, such as lenses and other elements developed for webcams, cell phone, notebook computers, and the like. Further, CMOS cameras typically have a relatively small amount of circuitry, which can be particularly advantageous for small portable computing devices, and the components can be obtained relatively cheaply, at least with respect to other types of camera sensor. As disclosed above, however, although these types of sensors consume less power than conventional camera sensors and are advantageous for small portable computing device, they do not always provide for precise gesture- and/or motion based input.

Approaches in accordance with various embodiments can take advantage of various aspects of CMOS camera technology, or other such technology, to provide a relatively low power but highly accurate gesture sensor that can utilize existing design and implementation aspects to provide a sensible solution to gesture detection. Such a gesture sensor can be used in addition to a conventional camera, such as in various color mapping or other related images information matching techniques in at least some embodiments, which can provide for improved gesture- and/or motion based tracking techniques, without utilizing a significant amount of resources on the device.

Figure 2:
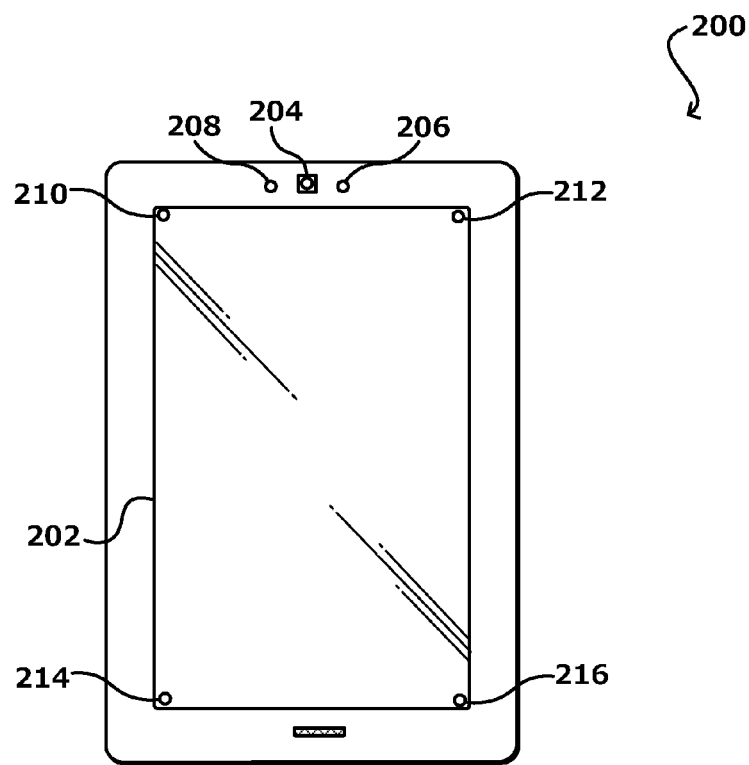
FIG. 2 illustrates an example computing device that can be used in accordance with various embodiments.

For example, FIG. 2 illustrates an example computing device 200 that can be used in accordance with various embodiments. In this example, the device has a conventional, "front facing" digital camera 204 on a same side of the device as a display element 202, enabling the device to capture image information about a user of the device during typical operation where the user is at least partially in front of the display element. In addition, there are four gesture sensors 210, 212, 214, 216 positioned on the same side of the device as the front-facing camera. One or more of these sensors can be used, individually, in pairs, or in any other combination, to determine input corresponding to the user when the user is within a field of view of at least one of these gesture sensors. It should be understood that there can be additional cameras, gesture sensors, or other such elements on the same or other sides or locations of the device as well within the scope of the various embodiments, such as may enable gesture or image input from any desired direction or location with respect to the device.

A camera and gesture sensor can be used together advantageously in various situations, such as where a device operates in a way to enable gesture recognition at relatively low power over an extended period of time using the gesture sensor, and perform facial recognition or other processor and power intensive processes at specific times using the conventional, higher resolution camera. In some embodiments two of the four gesture sensors will be used at any given time to collect image data, enabling determination of feature location and/or movement in three dimensions. Providing four gesture sensors enables the device to select appropriate gesture sensors to be used to capture image data, based upon factors such as device orientation, application, occlusions, or other such factors. As discussed, in at least some embodiments each gesture sensor can utilize the shape and/or size of a conventional camera, which can enable the use of readily available and inexpensive parts, and a relatively short learning curve since much of the basic technology and operation may be already known.

This example device also illustrates additional elements that can be used as discussed later herein, including a light sensor 206 for determining an amount of light in a general direction of an image to be captured and an illumination element 208, such as a white light emitting diode (LED) or infrared (IR) emitter as will be discussed later herein, for providing illumination in a particular range of directions when, for example, there is insufficient ambient light determined by the light sensor. Various other elements and combinations of elements can be used as well within the scope of the various embodiments as should be apparent in light of the teachings and suggestions contained herein.

As discussed, gesture detection does not require high resolution images for sufficient accuracy. For example, a relatively low resolution camera can determine that a person is moving his or her hand left to right. However, in certain situations, the relatively low resolution camera may not capture enough information to adequately provide for precise gesture- and/or motion based input to optimally track an object, such as in the case where the resolution is too low to determine the identity whether a hand belongs to a man or a woman, or the situation where the resolution is too low to determine a difference between two moving objects. Accordingly, in accordance with various embodiments, gesture- and/or motion-based input can be improved by mapping color information or other information obtained from a conventional camera (e.g., a high resolution camera) to one or more gesture sensors. In this way, aspects of a conventional camera, such as CMOS camera can be utilized along with aspects of one or more gesture cameras. In such an approach, information associated with an image, such as color information, acquired from a conventional camera of a computing device can be mapped to at least one gesture sensor of the computer device, and the information can be used as an additional input in gesture- and/or motion-based tracking techniques.

Figure 3A:
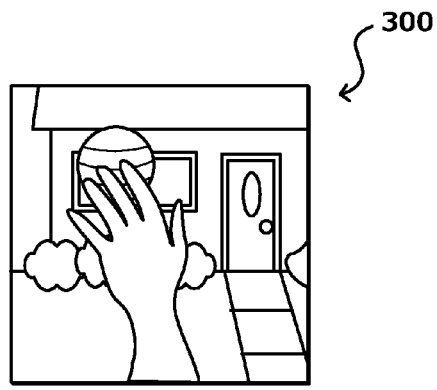
FIGS. 3(a)-3(f) illustrate an example of detecting motion of a hand in accordance with various embodiments.
Figure 3B:
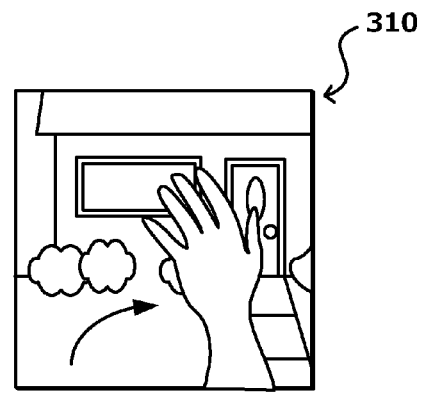

For example, FIGS. 3(a) and 3(b) illustrate an example of images 300 and 310 that can be captured of a hand while the hand is engaged in a waving motion. The images can be captured using both a conventional camera and at least one gesture sensor. To ensure a proper mapping between the conventional camera and the gesture sensor(s), the fields of view of the conventional camera and the gesture sensor(s) can initially be matched through careful placement and calibration, such as by using known calibration standards and adjusting an optical axis of the conventional camera and gesture sensors to have those axes be substantially parallel. During this initially matching period, mapping information, a model, or other transformation algorithm (such as a color mapping function) can be determined. The information can be used to map a pixel value corresponding to a pixel location of the conventional camera to a pixel location of at least one of the gesture sensors. In this way, color mapping can be any function that maps (i.e., transforms) the colors of one image to the colors of another image, such as in the case where the colors of a color image are mapped to the greyscale values of a greyscale image. For example, a first grouping of pixels for a first camera can correspond to a second grouping of pixels in a second camera. In some situations the pixel-to-pixel map can be a one-to-one mapping while in other situations, the first camera can include more pixels than the second camera. In this situation, where the number of pixels between the cameras are different (e.g., due to the different resolutions of the camera) a larger grouping of pixels for the first camera (e.g., a 5×5 grouping of pixels) can be transformed, converted, or otherwise mapped to a smaller grouping of pixels in the second camera (e.g., a 1×1 grouping of pixels). Accordingly, the mapping information can be used to map color, brightness, and/or other such information associated with pixels from the conventional camera to the gesture sensor(s), where such mapping takes into account the different resolutions of the cameras and sensors and position of said cameras relative to the gesture sensors on the computing device. In some embodiments, the mapping of pixel values acquired from the conventional camera to one of the gesture sensors can be determined by computing a homography transformation (e.g., using Hough corner/interest points, interest point matching, RANSAC, etc.). Alternatively, in accordance with an embodiment, a non-linear transformation can be used to determine pixel mappings. In at least some embodiments, the mapping information can be updated, as may be required due to misalignment of the camera and gesture sensors due to impacts or other events that can cause the cameras and sensors to be misaligned.

Figure 3C:
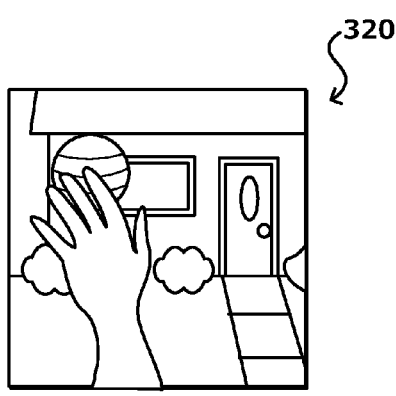
Figure 3D:
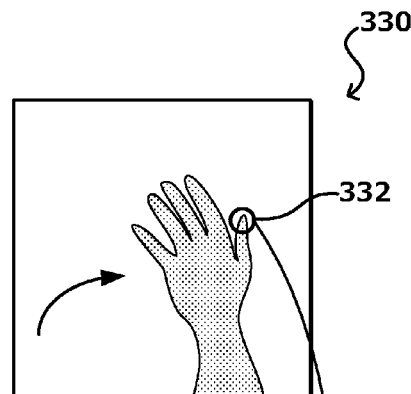

FIGS. 3(c) and 3(d) illustrate an example of images 320 and 330 that represent images captured of the hand moving in a left to right motion using a conventional camera of the device. As described, the conventional camera can be a relatively high resolution color camera (e.g., 5.0 MP or above), such as CMOS or CCD cameras, among other such options. Associated with these images can be color information or other information such as brightness or intensity information. For example, each of the pixels that represent the image acquired by the conventional camera can have associated therewith a color value such as a RGB value or a brightness value.

In accordance with various embodiments, the color information and/or other determined information can be mapped to one or more gesture sensors to improve gesture- and/or motion-based tracking. As described, the mapping information can be used to map color, brightness, and/or other such information associated with pixels from the conventional camera to the gesture sensor(s), where such mapping takes into account the different resolutions of the cameras and sensors and position of said cameras relative to the gesture sensors on the computing device. For example, image 340 illustrated in FIG. 3(e) can be captured at substantially the same time as image 320 acquired by the conventional camera. In accordance with an embodiment, image 340 illustrates a low resolution image acquired by the gesture sensor. Color information associated with image 320 acquired by the conventional camera can be mapped to the gesture sensor and associated with the low resolution image 340 acquired by the gesture sensor. For example, during a first period of time (e.g., a first frame), the conventional camera can acquire image 320, and at substantially the same time (e.g., within a threshold period of time), the gesture sensor can acquire an image 340. Color information from image 320 can be mapped to the gesture sensor using mapping information.

In various embodiments, before the color information is mapped to the gesture sensor, the acquired image can be analyzed to determine a set of feature points or other such aspects or portions of the image that can be located in other images, and only color information associated with these points is mapped to the gesture sensor. In other embodiments, only the color information associated with a subset of the feature points is mapped to the gesture sensor. As known for such purposes, feature points, image points, or other such features of each image can be determined using one or more feature detection algorithms (e.g., SIFT or SURF), corner finding algorithms, pattern matching algorithms, contour detection algorithms, and the like, as may recognize unique features or shapes, among other such features, that can be recognized in each image.

Figure 3E:
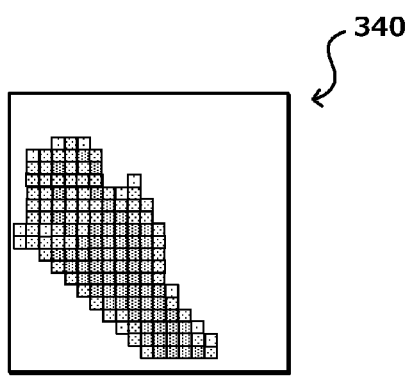
Figure 3F:
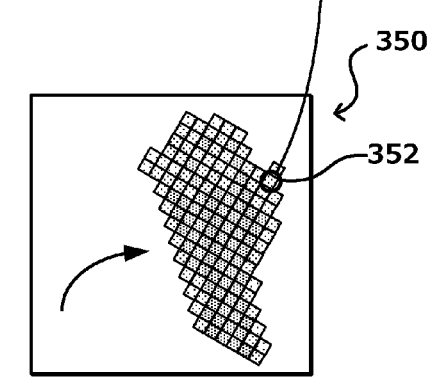

In various other embodiments, before color information is mapped to the gesture sensor, position information of the object represented in the first image can be determined. Position information used to locate the object in the first image can be determined in a number of ways. For example, feature points, image points, or other such features of each image can be determined using one or more feature detection algorithms, and the location of the detected features can be determined. Using one or more transformation functions, such information can be mapped to the gesture sensor. The position information can be used to identify a location of the object represented in an image captured by the second camera. As subsequent images of the object are captured by the second camera, the object can be tracked based at least in part on the position information and color information mapped from the first camera. For example, as the second camera captures images, the color and position information can be prorogated between each captured image, and one of more object tracking algorithms (e.g., mean-shift tracking algorithm) can be used to track the object in the images During a second period of time (e.g., a second frame), the conventional camera acquires image 330, and at substantially the same time, the gesture sensor acquires image 350. As the object moves from one position to another (e.g., from left to right), gesture- and/or motion-based tracking can be performed using the low resolution images 340 and 350 acquired by the gesture sensor. For example, consider the low resolution images of FIGS. 3(e) and 3(f). When a user moves a hand and arm from right to left across the gesture sensor, for example, there will be an area of relative light and/or dark that will move across the images. As illustrated, the darker pixels in the image 340 of FIG. 3(e) are shifted to the right in the image 350 of FIG. 3(f). Using only a small number of pixel values, the device can attempt to determine when features such as the darker pixels move back and forth in the low resolution images. Similarly, in various embodiments, the optical flow determined frame-to-frame can indicate that the hand moved. In accordance with various embodiments, optical flow can be determined using a number of different algorithms, including but not limited to, phase correlation algorithms, block-based algorithms, differential algorithms of estimating optical flow, among others. Optical flow algorithms can be used in gesture- and motion-based tracking approaches to track points (e.g., feature points) across a sequence of images. For example, given a set of feature points in an image, the same points can be determined in another image. In this way, an object can be tracked frame-by-frame by determining the optical flow.

In some situations, other motion might occur due to any of a number of other situations, such as people walking by, a ball moving by, etc., which can be incorrectly detected as motion of the object a user intends to track. Accordingly, object tracking can be improved using the transferred color information. For example, as described, the images acquired by the gesture sensor can be used to determine that the hand move from left to right. To verify that the hand moved, as opposed to another object moving near or around the hand, color information associated with a feature point 352 on image 350 acquired by the gesture sensor corresponding to the hand can be compared to color information of a corresponding feature point 332 on image 330 acquired by the conventional camera also corresponding to the hand to determine a color difference As described, such feature points can be determined using one or more feature detection algorithms, and the color information associated with these features mapped using the mapping information.

Figure 4A:
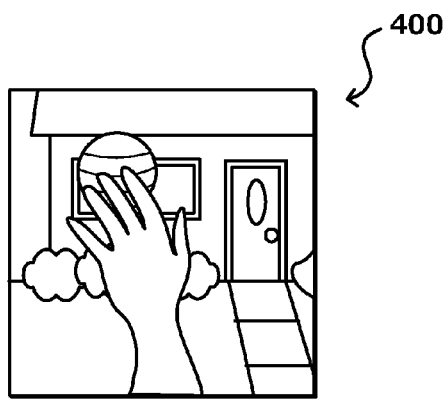
FIGS. 4(a)-4(f) illustrate an example of detecting motion of a ball in accordance with various embodiments.
Figure 4B:
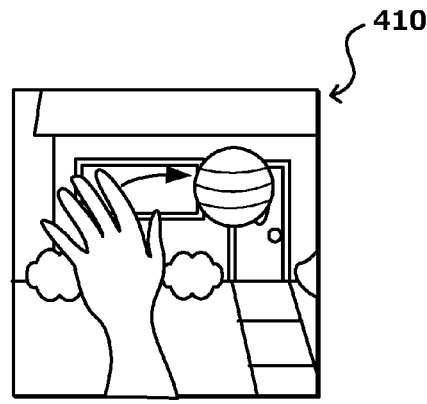

In accordance with an embodiment, the comparison can compare the relative color of each feature point. When the color of the respective feature points substantially match, e.g., the difference between the two colors is less than a threshold amount, it can be assumed that the detected motion was the motion of the hand. When the color of the respective feature points do not substantially match, e.g., the color difference between the two colors is greater (or equal to) than a threshold amount, it can be assumed that the detected motion was motion of another object. For example, FIGS. 4(a)-4(f) illustrate an example of detecting motion of a ball when the intended object to be tracked was a hand. FIGS. 4(a) and 4(b) illustrate an example of images 400 and 410 that can be captured of a ball and hand. As shown, the ball is moving in a left to right motion and the hand does not move.

Figure 4C:
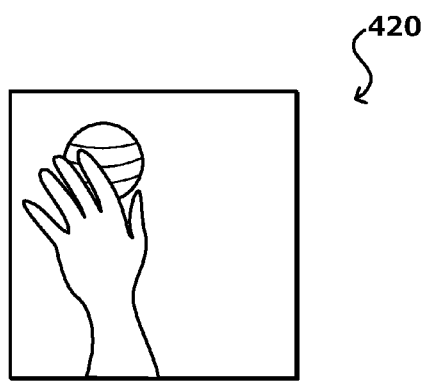
Figure 4D:
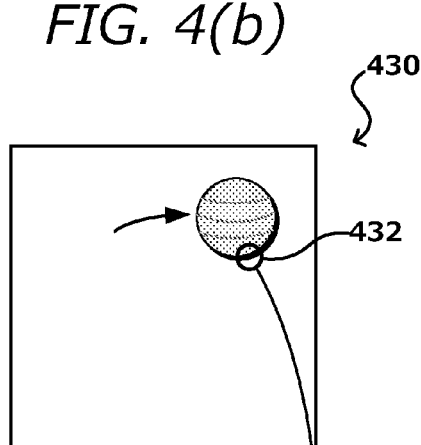
Figure 4E:
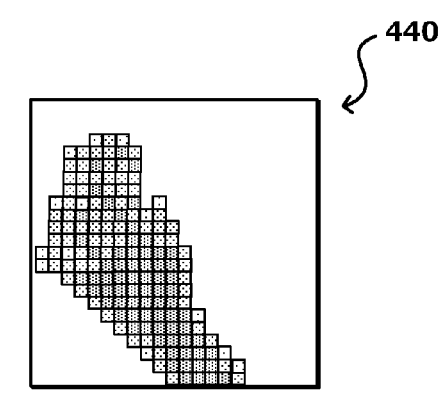
Figure 4F:
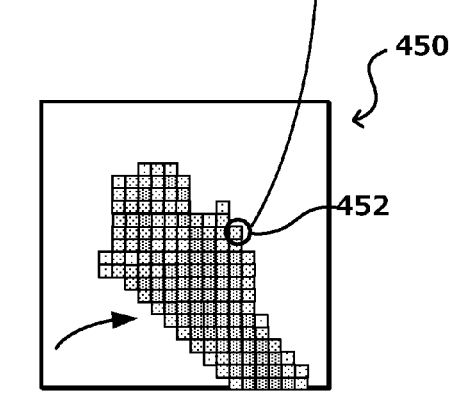

As described, the scene represented in the images can be captured using both a conventional camera and a gesture sensor. For example, FIGS. 4(c) and 4(d) illustrate an example of images 420 and 430 that represent images of a ball moving in a left to right motion acquired using a conventional camera of the device. Associated with these images can be color information. FIGS. 4(e) and 4(f) illustrate an example of images 440 and 450 that represent images acquired using a gesture camera. In accordance with various embodiments, image 440 illustrated in FIG. 4(e) can be captured at substantially the same time as image 420 acquired by the conventional camera. In accordance with an embodiment, image 440 illustrates a low resolution image acquired by the gesture sensor. Color information associated with image 420 acquired by the conventional camera can be mapped to the gesture sensor and associated with the low resolution image 440 acquired by the gesture sensor.

In this example, the intended object to be tracked is the hand. However, as the balls moves from one position to another (e.g., from left to right), gesture- and/or motion-based tracking algorithms using the low resolution images 440 and 450 acquired by the gesture sensor cannot distinguish between tracking the hand and user, given the relative size, shape, and/or proximity of the two objects. For example, as illustrated in images 440 and 450, movement of the ball is being tracked, as illustrated by the area of relative light and/or dark pixels that move across the images. In this situation, motion due to the ball is incorrectly detected as motion of the object a user intends to track, in this situation, the arm. Accordingly, in accordance with various embodiments, the mapped color information can be used to determine that the wrong object was tracked.

For example, to verify whether the arm is being tracked, the color value associated with feature point 452 of image 450 acquired by the gesture camera can be compared to a corresponding feature point 432 in image 430 acquired by the conventional camera. Since the arm is desired to be tracked, color values associated with the arm should be represented in image 450 acquired by the gesture camera and in image 430 acquired by the conventional camera. However, in this example, feature point 452 of image 450 acquired by the gesture camera corresponds to a hand (where the color associated with this feature point is one of a number of colors associated with skin tones) and the feature point 432 of image 430 acquired by the conventional camera corresponds to a ball (e.g., a red ball). Accordingly, when comparing color information associated with feature point 452 in image 450 acquired by the gesture sensor to corresponding feature point 432 in image 430 acquired by the conventional camera, it is determined that the colors are substantially different (e.g., the difference between the two colors is greater (or equal to) a threshold amount. In this situation, it can be assumed that the incorrect object is being tracked. Accordingly, the color map can be updated, and the process reinitiated.

Figure 5:
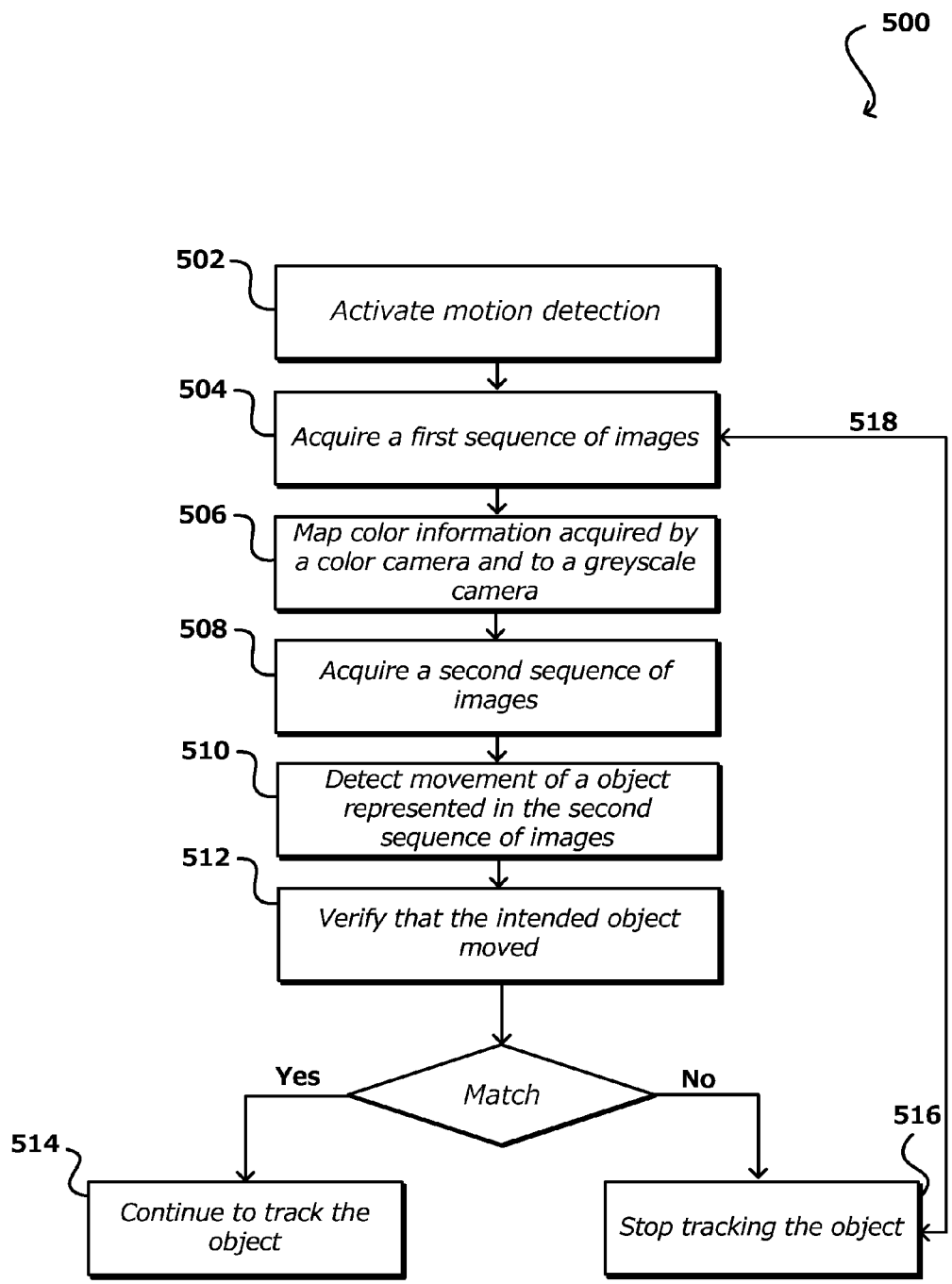
FIG. 5 illustrates an example computing process for enabling gesture input that can be used in accordance with various embodiments.

FIG. 5 illustrates an example process 500 for enabling gesture input for such a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a motion detection mode is activated on the computing device 502. In some embodiments, the motion detection mode can automatically be turned on whenever the computing device is active, even in a sleep mode or other such low power state. In other embodiments, the motion detection mode is activated automatically upon running an application or manually upon user selection. Various other activation events can be utilized as well. In accordance with various embodiments, motion detection is the process of detecting moving objects or features of those objects from a captured image or video. It should be noted that there are various approaches to identifying a feature in an image for motion detection purposes, such may include feature detection, facial feature extraction, feature recognition, stereo vision sensing, character recognition, attribute estimation, or radial basis function (RBF) analysis approaches, are well known in the art and will not be discussed herein in detail. Upon detecting such a shape, contour, or feature, the device can track a relative position or area in the captured image information. Approaches for detecting and tracking shapes, contours, and/or features are known in the art. Some approaches for detecting and tracking shapes, contours, and/or features in a video or sequence of images are based on comparing a frame of the video (or an image) with the next-frame or previous-frame. For example, one such approach is to perform background subtraction. With background subtraction, a static scene model is built, which is called the background. Incoming frames are compared to this background in order to detect regions of movement. It should be noted that other motion detection algorithms can be used in accordance with embodiments described herein, such algorithms including, but not limited to foreground motion detection by difference-based spatial temporal entropy image, among others. As discussed, gesture- and/or motion-based input can be improved by mapping color information or other information obtained from a conventional camera (e.g., a high resolution camera) to one or more gesture sensors. In this way, aspects of a conventional camera, such as CMOS camera can be utilized along with aspects of one or more gesture cameras. For example, mapping information can be used to map color, brightness, and/or other such information associated with pixels from the conventional camera to the gesture sensor(s), where such mapping takes into account the different resolutions of the cameras and sensors and position of said cameras relative to the gesture sensors on the computing device.

A first sequence of images can be acquired 504 using both a conventional camera and at least one gesture sensor of at least one object. For example, during a first period of time (e.g., a first frame), the conventional camera can acquire a first camera image, and at substantially the same time (e.g., within a threshold period of time), the gesture sensor can acquire a first gesture sensor image. Color information associated with the first camera image can be mapped 506 to the gesture sensor and associated the first gesture image. As described, to ensure a proper mapping between the conventional camera and the gesture sensor(s), the fields of view of the conventional camera and the gesture sensor(s) can initially be matched through careful placement and calibration, such as by using known calibration standards and adjusting an optical axis of the conventional camera and gesture sensors to have those axes be substantially parallel. In various embodiments, as described, before the color information is mapped to the gesture sensor, the acquired image can be analyzed to determine a set of feature points or other such aspects or portions of the image that can be located in other images, and only color information associated with these points is mapped to the gesture sensor. In other embodiments, only the color information associated with a subset of the feature points is mapped to the gesture sensor. As known for such purposes, feature points, image points, or other such features of each image can be determined using one or more feature detection algorithms (e.g., SIFT or SURF), corner finding algorithms, pattern matching algorithms, contour detection algorithms, and the like, as may recognize unique features or shapes, among other such features, that can be recognized in each image.

A second sequence of images can be acquired 508 after the mapping. For example, during a second period of time (e.g., a second frame), the conventional camera acquires a second camera image, and at substantially the same time, the gesture sensor acquires a second gesture sensor image. Movement of the object can be detected 510 based at least in part on the first and the second gesture sensor image. For example, processing pixel values of the first and the second gesture sensor image, the device can determine when features such as the darker pixels move back and forth in the first and the second gesture, which can indicate movement of the object. To verify 512 that the intended object moved, as opposed to another object moving near or around the object, color information associated with a feature point in the second image of the gesture sensor image can be compared to a corresponding feature point in the first image of the camera. As described, such feature points can be determined using one or more feature detection algorithms, and the color information associated with these features mapped using the mapping information.

When the color of the respective feature points substantially match, e.g., the difference between the two colors is less than a threshold amount, it can be assumed that the detected motion was the motion of the intended object, and the object can continue 514 to be tracked. When the color of the respective feature points do not substantially match 516, e.g., the difference between the two colors is greater (or equal to) than a threshold amount, it can be assumed that the detected motion was motion of another object, and tracking the object can stop. In this situation, it can be assumed that object tracked is the wrong object. Accordingly, the color map can be updated and the process reinitiated 518.

Figure 6:
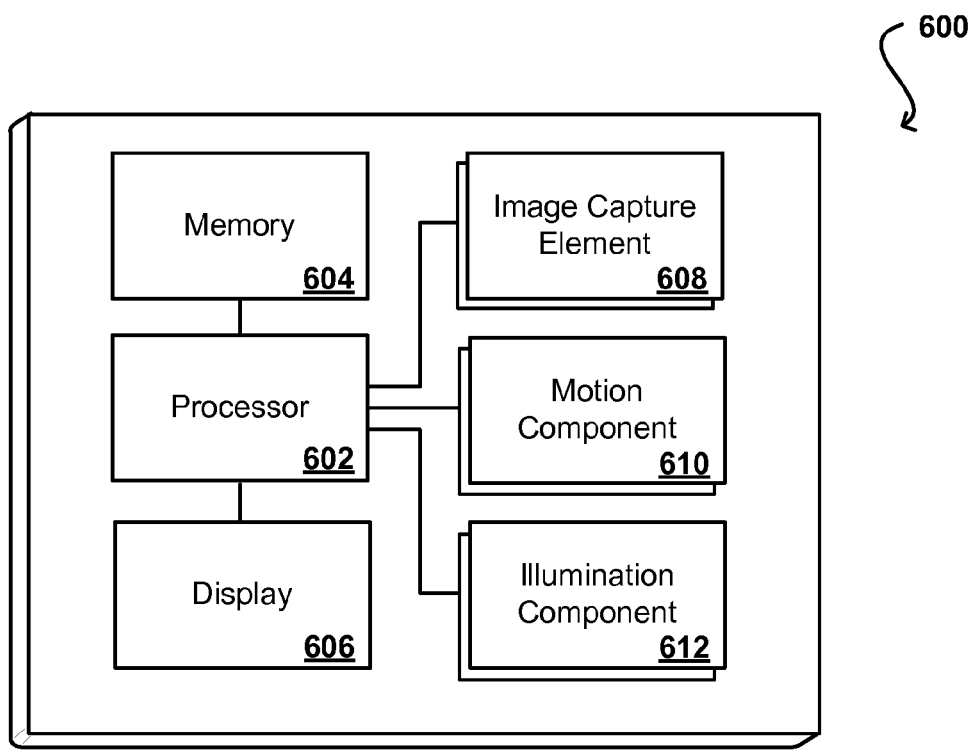
FIG. 6 illustrates an example configuration of components of a computing device such as that illustrated in FIG. 2.

In order to provide various functionality described herein, FIG. 6 illustrates an example set of basic components of a computing device 600, such as the device 104 described with respect to FIG. 1. In this example, the device includes at least one central processor 602 for executing instructions that can be stored in at least one memory device or element 604. As would be apparent to one of ordinary skill in the art, the device can include many types of memory, data storage or computer-readable storage media, such as a first data storage for program instructions for execution by the processor 602, the same or separate storage can be used for images or data, a removable storage memory can be available for sharing information with other devices, etc. The device typically will include some type of display element 606, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology. As discussed, the device in many embodiments will include at least one image capture element 608, such as one or more cameras that are able to image a user, people, or objects in the vicinity of the device. The device can also include at least one separate gesture sensor 610 operable to capture image information for use in determining gestures or motions of the user, which will enable the user to provide input through the portable device without having to actually contact and/or move the portable device. An image capture element can include, or be based at least in part upon any appropriate technology, such as a CCD or CMOS image capture element having a determine resolution, focal range, viewable area, and capture rate. As discussed, various functions can be included on with the gesture sensor or camera device, or on a separate circuit or device, etc. A gesture sensor can have the same or a similar form factor as at least one camera on the device, but with different aspects such as a different resolution, pixel size, and/or capture rate. While the example computing device in FIG. 1 includes one image capture element and one gesture sensor on the "front" of the device, it should be understood that such elements could also, or alternatively, be placed on the sides, back, or corners of the device, and that there can be any appropriate number of capture elements of similar or different types for any number of purposes in the various embodiments. The device also can include at least one lighting element 612, as may include one or more illumination elements (e.g., LEDs or flash lamps) for providing illumination and/or one or more light sensors for detecting ambient light or intensity.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 7:
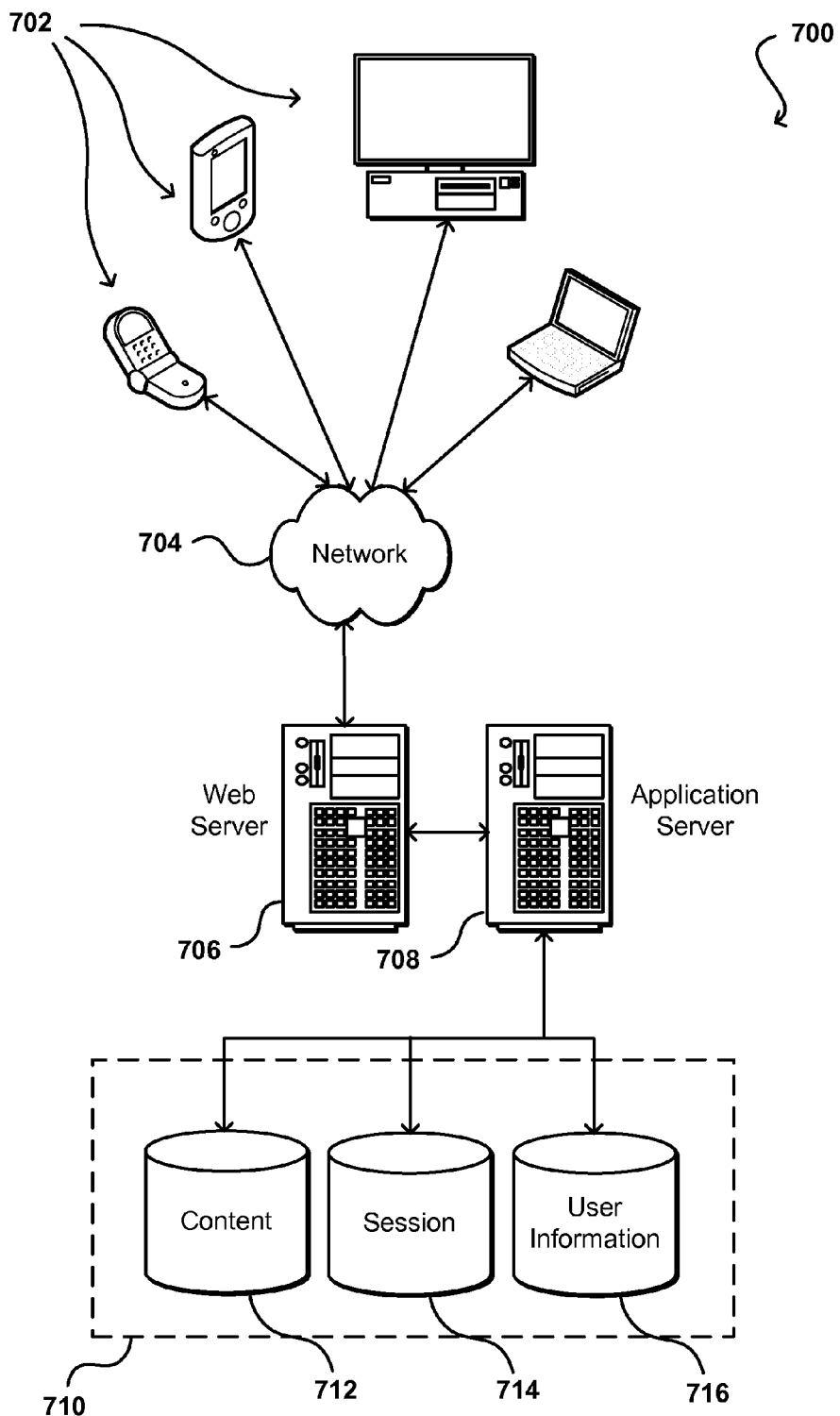
FIG. 7 illustrates an example environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one computing device processor;
   a first camera operating at a first resolution and having a first field of view, the first camera being configured to capture color image data at the first resolution;
   a gesture sensor operating at a second resolution, the gesture sensor having a second field of view that at least partially overlaps the first field of view, the second resolution being lower than the first resolution and the gesture sensor being configured to capture grayscale image data; and
   a memory device including instructions that, when executed by the at least one computing device processor, enables the computing device to:
   determine a pixel location mapping based on a homography transformation, associating camera pixel locations of the first camera and gesture pixel locations of the gesture sensor;
   capture first color image data of an object using the first camera;
   capture first grayscale image data of the object using the gesture sensor;
   recognize, in the first grayscale image data, a first group of pixel values corresponding to a first representation of the object;

recognize, in the first grayscale image data, a seventh group of pixel values that do not correspond to the first representation of the object;
recognize, in the first color image data and based on the pixel location mapping and the first group of pixel values, a second group of pixel values corresponding to a second representation of the object;
based at least in part on the seventh group of pixel values not corresponding to the second representation of the object, generate first mapped image data by selectively associating the first group of pixel values with the second group of pixel values, without associating the seventh group of pixel values with the second group of pixel values;
capture second grayscale image data of the object using the gesture sensor;
detect motion based at least in part on a change between the first grayscale image data and the second grayscale image data;
recognize, in the second grayscale image data, a third group of pixel values based at least in part on the detected motion and the first group of pixel values;
capture second color image data using the first camera;
recognize, in the second color image data and based on the pixel location mapping and the third group of pixel values, a fourth group of pixel values;
determine a first color associated with the second group of pixel values;
determine a second color associated with the fourth group of pixel values;
determine that a difference in color between the first color and the second color is greater than a threshold amount; and
determine, based at least in part on the difference in color being greater than the threshold amount, that the third group of pixel values does not correspond to a representation of the object.

2. The computing device of claim 1, wherein the instructions, when executed, further cause the computing device to:
recognize in the second color image data, based at least in part on the first color of the second group of pixel values, a fifth group of pixel values;
recognize in the second grayscale image data and based on the pixel location mapping and the fifth group of pixel values, a sixth group of pixel values;
generate second mapped image data by associating the fifth group of pixel value with the sixth group of pixel values; and
track the object based at least on the first mapped image data and the second mapped image data.

3. The computing device of claim 1, wherein the instructions when executed further cause the computing device to:
identify a first set of interest points corresponding to the first representation of the object;
identify a second set of interest points in the second representation of the object, the second set of interest points corresponding to the first set of interest points;
determine a respective pixel color value for the second set of interest points; and
map the respective pixel color value for the second set of interest points to the first set of interest points.

4. The computing device of claim 1, wherein the homography transformation is based at least in part on the first resolution, the second resolution, and a relative location of the first camera with regard to the gesture sensor.

5. A computer implemented method, comprising:
determining a pixel location mapping based on a homography transformation, associating first pixel locations of a first camera having a first resolution and second pixel locations of a second camera having a second resolution, the second resolution being lower than the first resolution;
recognizing a first representation of an object represented in first grayscale image data acquired by the second camera;
recognizing a first group of pixel values corresponding to the first representation of the object;
recognizing, in the first grayscale image data, a fourth group of pixel values that do not correspond to the first representation of the object;
recognizing, based on the pixel location mapping and the first group of pixel values, a second group of pixel values corresponding to a second representation of the object in first color image data acquired by the first camera;
based at least in part on the fourth group of pixel values not corresponding to the first representation of the object, generating first mapped image data by selectively associating the first group of pixel values with the second group of pixel values, without associating the fourth group of pixel values with the second group of pixel values;
detecting motion based at least in part on a first change in position, the first change in position based at least in part on the first grayscale image data and second grayscale image data captured by the second camera;
analyzing, based at least in part on the pixel location mapping and the first mapped image data, second color image data acquired by the first camera to determine that first pixel color data associated with the second representation of the object differs from second pixel color data in the second color image data, by greater than a threshold amount;
recognizing, based at least in part on the first pixel color data, a third group of pixel values in third color image data acquired by the first camera;
determining a second change in position between the first pixel color data and the third pixel color data; and
determining that the object moved, based on the second change in position.

6. The computer implemented method of claim 5, further comprising:
identifying the object in at least one subsequent image acquired by the first camera.

7. The computer implemented method of claim 6, further comprising:
analyzing the at least one subsequent image using at least one object recognition algorithm to locate the object.

8. The computer implemented method of claim 5, further comprising:
determining a homography transformation function based at least in part on the first resolution, the second resolution, and a location of the first camera on a computing device relative to the second camera; and
storing the homography transformation function.

9. The computer implemented method of claim 5, further comprising:
mapping color data associated with pixel locations of a first sequence of images acquired by the first camera to corresponding pixels locations in a second sequence of images acquired by the second camera.

10. The computer implemented method of claim 9, wherein mapping the color data further includes:

identifying a first set of interest points corresponding to the second representation of the object in the first color image data;

determining a respective pixel color value for the first set of interest points;

identifying a corresponding second set of interest points in the first representation of the object in the first grayscale image data; and mapping the respective pixel color value for the first set of interest points to the corresponding second set of interest points.

11. The computer implemented method of claim 5, wherein recognizing the first representation of the object and recognizing the second representation of the object includes analyzing a first sequence of images acquired by the first camera and a second sequence of images acquired by the second camera using at least one feature recognition algorithm.

12. The computer implemented method of claim 5, wherein detecting motion includes:

identifying a respective plurality of feature points in the first grayscale image data and the second grayscale image data;

determining a respective image descriptor for interest points at least a subset of the respective plurality of feature points; and detecting motion based at least in part on a change in position of at least one image descriptor between the first grayscale image data and the second grayscale image data.

13. The computer implemented method of claim 5, wherein the first color image data further includes brightness information, depth information, or contrast information.

14. The computer implemented method of claim 5, wherein the first camera is a color camera, and wherein the second camera is a monochrome camera.

15. A computing device, comprising:

at least one computing device processor;

a first camera operating at a first resolution, the first camera being configured to capture color image data at the first resolution;

a second camera operating at a second resolution, the second resolution being lower than the first resolution, the second camera being configured to capture grayscale image data at the second resolution; and a memory device including instructions that, when executed by the at least one computing device processor, enables the computing device to:

determine a pixel location mapping based on a homography transformation, associating first pixel locations of the first camera and second pixel locations of the second camera;

recognize a first representation of an object associated with first grayscale image data acquired by the second camera;

recognize a first group of pixel values corresponding to the first representation of the object in the first grayscale image data;

recognize a fourth group of pixel values that do not correspond to the first representation of the object in the first grayscale image data;

recognize, based on the pixel location mapping and the first group of pixel values, a second group of pixel values corresponding to a second representation of the object associated with first color image data acquired by the first camera;

based at least in part on the fourth group of pixel values not corresponding to the first representation of the object, generate first mapped image data by selectively associating the first group of pixel values with the second group of pixel values, without associating the fourth group of pixel values with the second group of pixel values;

detect motion based at least in part on a first change in position, the first change in position based at least in part on the first grayscale image data and second grayscale image data captured by the second camera;

analyze, based at least in part on the pixel location mapping and the first mapped image data, second color image data acquired by the first camera to determine that first pixel color data associated with the second representation of the object differs from second pixel color data in the second color image data, by greater than a threshold amount;

recognize, based at least in part on the first pixel color data, a third group of pixel values in third color image data acquired by the first camera;

determine a second change in position between the first pixel color data and the third pixel color data; and determine that the object moved, based on the second change in position.

16. The computing device of claim 15, wherein the instructions, when executed, further cause the computing device to:

identify the object in at least one subsequent image acquired by the first camera.

17. The computing device of claim 15, wherein the instructions, when executed, further cause the computing device to:

determine a homography transformation function based at least in part on the first resolution, the second resolution, and a location of the first camera on a computing device relative to the second camera; and store the homography transformation function.

18. The computing device of claim 15, wherein the instructions, when executed, further cause the computing device to:

identify a respective plurality of feature points in the first grayscale image data and the second grayscale image data;

determine a respective image descriptor for interest points of at least a subset of the respective plurality of feature points; and detect motion based at least in part on a change in position of at least one image descriptor between the first grayscale image data and the second grayscale image data.

* * * * *